US006449347B1

United States Patent
Ple et al.

(10) Patent No.: US 6,449,347 B1
(45) Date of Patent: Sep. 10, 2002

(54) PUBLIC TERMINAL FOR ACCESS TO A COMPUTER NETWORK

(75) Inventors: Jean Ple, Quincy sous Senart; Jean-Marie Campagnet, Bondoufle; Jean-Pierre Lezin, Courcouronnes, all of (FR)

(73) Assignee: France Telecom, Paris (FR)

( * ) Notice: Subject to any disclaimer, the term of this patent is extended or adjusted under 35 U.S.C. 154(b) by 3 days.

(21) Appl. No.: 09/611,724

(22) Filed: Jul. 6, 2000

(30) Foreign Application Priority Data

Jul. 6, 1999 (FR) ............................................ 99 08721

(51) Int. Cl.[7] ............................................ H04M 11/00
(52) U.S. Cl. ................... 379/93.22; 379/91.01
(58) Field of Search .......................... 379/93.22–93.25, 379/93.37, 93.05–93.08, 93.12, 93.13, 90.01, 91.01, 900; 235/380, 381; 709/227

(56) References Cited

U.S. PATENT DOCUMENTS 5,602,905 A  2/1997  Mettke
5,812,765 A  9/1998  Curtis

FOREIGN PATENT DOCUMENTS

| EP | 0 902 580 | 3/1999 |
| EP | 0 915 410 | 5/1999 |
| WO | WO 98/40826 | 9/1998 |

*Primary Examiner*—Wing F. Chan
(74) *Attorney, Agent, or Firm*—Young & Thompson

(57) ABSTRACT

A public terminal links to an analog telephone network (STN) and to a digital network (ISDN), and includes a central unit (12) furnished with peripherals (14, 16, 18) providing a human/machine interface, an algorithm for navigating around the computer network, and a telecommunications payment card reader (22) that is linked to telephony circuits for establishing a telephone link with a server center as a function of available credit and for maintaining the telephone link. The terminal is linked to the digital network by a relay (38) controlled by the central unit (12) in such a way as to establish a communication between the central unit and the digital network so long as the analog telephone link with the server center is maintained.

12 Claims, 3 Drawing Sheets

PUBLIC TERMINAL FOR ACCESS TO A COMPUTER NETWORK

BACKGROUND OF THE INVENTION

The present invention relates to a public terminal for access to a computer network, in particular a network of the "Internet" type.

Such a terminal is intended to be sited in a public place for unrestricted use by the public by using a payment card, for example a telephone card or a bank card.

To do this, this terminal comprises, in a conventional manner, means of linking to an analogue telephone network, a central unit furnished with peripherals providing a human/machine interface, an algorithm for navigating around the computer network stored in memory, and a telecommunications payment cards reader linked to automatic means for establishing a telephone link with a server centre and for maintaining the said telephone link as a function of an available call credit, which are activated as long as a payment card is introduced into the reader.

This type of terminal comprises a number of drawbacks, especially by reason of the fact that the transferring of files to the terminal is relatively lengthy, in so far as they are conveyed over an in analogue line of the telephone network.

The aim of the invention is to alleviate this drawback.

SUMMARY OF THE INVENTION

The subject of the invention is therefore a public terminal for access to a computer network of the aforesaid type, characterized in that it is furnished with means of linking to a digital network, comprising a relay controlled by the central unit in such a way as to establish a communication between the latter and the digital network as long as the telephone link with the server centre is maintained.

In various embodiments, the access terminal according to the invention comprises one or more of the following characteristics, taken in isolation or according to all technically possible combinations:

- the central unit is linked to a card adapted so as to place the central unit in communication with the digital network (ISDN) and controlling the relay in such a way as to establish the said communication with the digital network upon reception of a metering pulse received from a telephony network to which the server centre is connected;
- in the course of the telephone link between the server centre and the terminal, these latter exchange signals in such a way as to simulate a communication so as to maintain the telephone link;
- it furthermore comprises, stored in memory, data which can be accessed free of charge by a user;
- the signals exchanged between the server and the terminal constitute means of transferring data for their storage in memory;
- it furthermore comprises means for directly controlling the relay in the absence of telephone communication established with the server centre, especially for updating the data stored in the terminal;
- the server centre is a server centre of telematic type.

BRIEF DESCRIPTION OF THE DRAWINGS

Other characteristics and advantages will emerge from the following description, given merely by way of example and with reference to the appended drawings.

DESCRIPTION OF PREFERRED EMBODIMENTS

Figure 1:
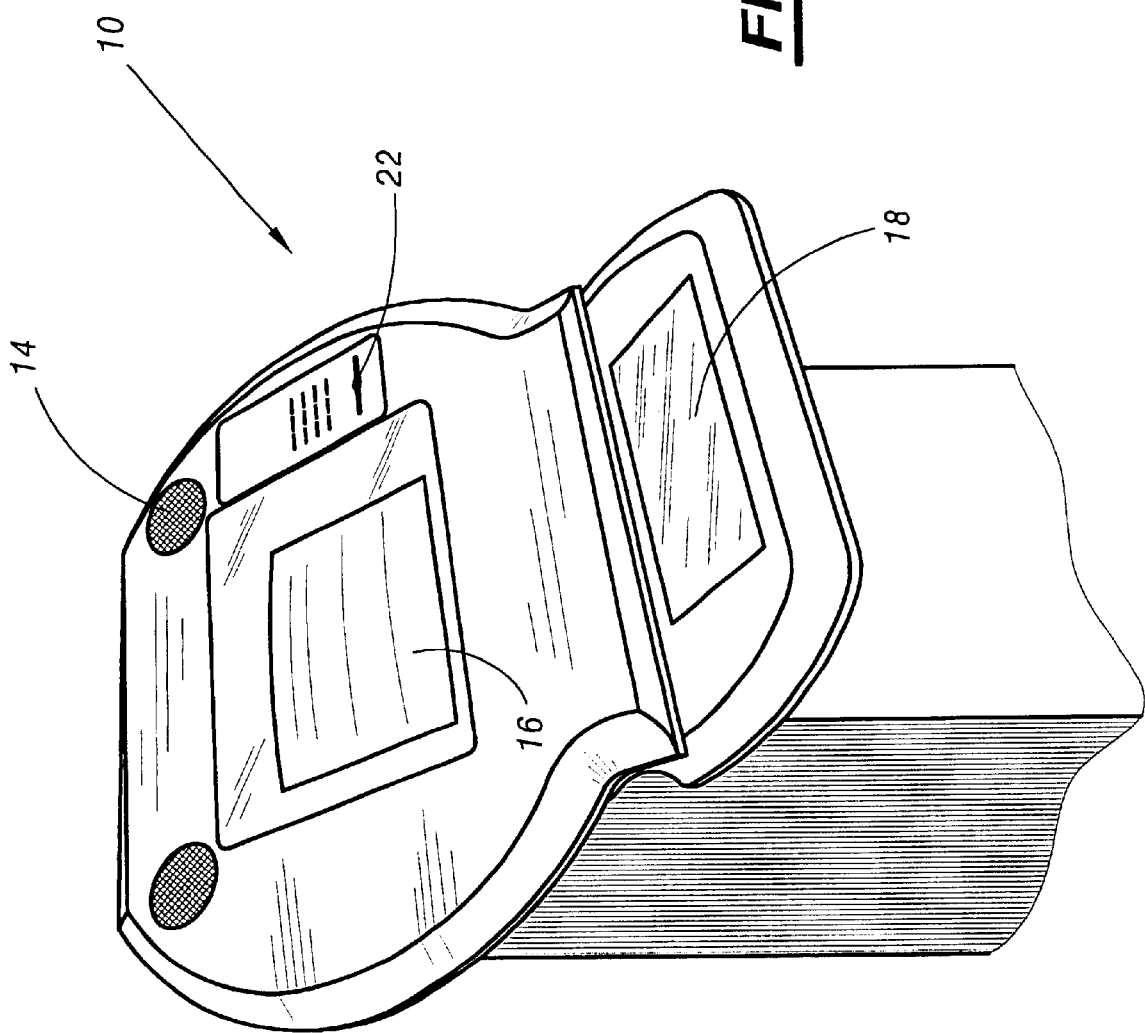
FIG. 1 is a perspective view of an access terminal according to the invention.

Represented in FIG. 1 is a perspective diagrammatic view of a terminal for access to a computer network, in particular "Internet", in accordance with the invention, designated by the general numerical reference 10.

The said terminal is intended to be sited in a public place for unrestricted access by the public by using a telecommunications payment card. As is conventional, such a card can consist of a telephone card of the "phone card" type, a card sold by the operators of telephony networks, or a bank card. In the latter case, the terminal incorporates known means for authenticating the card and for identifying the carrier.

Figure 2:
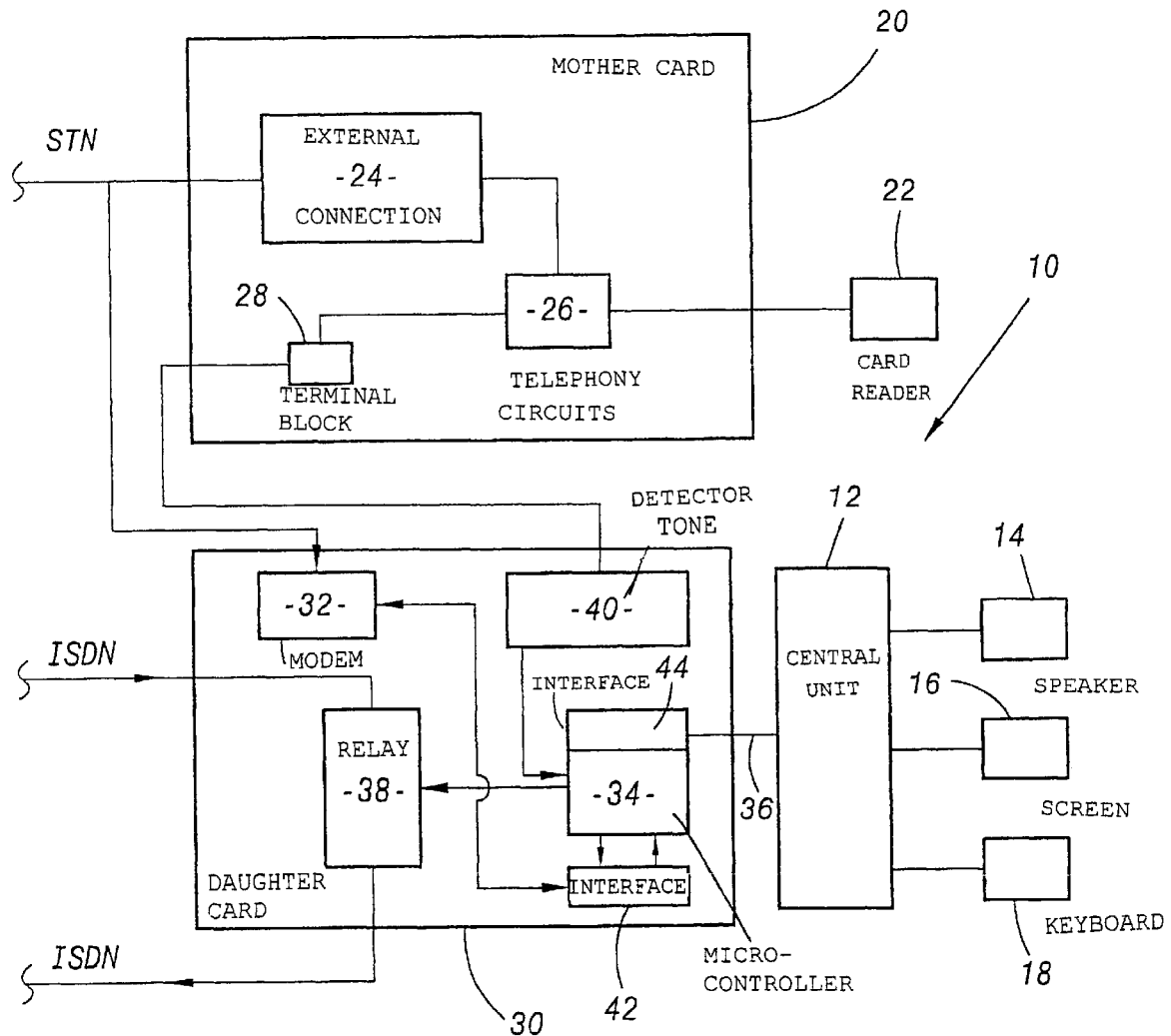
FIG. 2 is a schematic diagram illustrating diagrammatically the make up of the access terminal of FIG. 1 and, FIG. 3 is a flow chart illustrating the operation of the terminal of FIGS. 1 and 2.

Referring also to FIG. 2, the terminal 10 consists mainly of a central unit 12 to which are linked peripherals providing a human/machine interface, namely loudspeakers such as 14, a screen 16 and a keyboard 18, as well as of public telephony elements consisting mainly of a mothercard 20 to which a telecommunications payment cards reader 22 is linked.

An algorithm for navigating around the computer network is stored in memory in the central unit 12.

The mothercard 20 consists of a "Public payphone" card of conventional type. It will therefore not be described in detail hereinbelow. It will however be noted that it is furnished with an external connection card 24 for linking the terminal to an analogue telephone network STN and with telephony circuits 26 allowing a telephone link to be established with a server centre called by way of the STN telephone network by dialling the telephone number of the server stored in memory in the terminal 10 and allowing this link to be maintained.

Furthermore, it may be seen in FIG. 2 that to a terminal block 28 connected to the telephony circuits 26, and which is conventionally used for linking up a telephone handset, is linked a daughtercard 30 itself connected to the central unit 12 for placing the latter in communication with a digital network. The expression digital network is understood within the framework of the present description to mean a network conveying digital information, especially an ISDN digital telephone network, a local network, a cable television company network.

The daughtercard 30 is also linked to the analogue telephone network STN by means of a modem 32.

The said daughtercard comprises a microcontroller 34 linked to the central unit 12 by a serial link 36, for example of the RS232 type, and a relay 38 controlled by the microcontroller 34 and wired to a digital line of the digital telephone network ISDN so as to establish a communication between the central unit 12 and this ISDN network as soon as a telephone link is established with the server over the analogue line of the STN network.

Direct control of the relay 38 by the central unit 12, that is to say in the absence of any telephone link, is possible via this serial link 36 in such a way as to establish a communication between the terminal and the digital network, especially for updating data stored in the terminal as will be described hereinbelow, for use of the terminal free of charge, or telemaintenance of the latter.

The daughtercard 30 is supplemented with a tone detection circuit 40 linked to the microcontroller 34 and receiving, as input, the signals gathered on the terminal block 28 as well as with serial interface circuits 42 and 44 of the UART type, one of which, 42, is an external interface circuit interposed between the modem 32 and the microcontroller 34 and the other of which, 44, is an internal interface circuit inside the microcontroller 34 for placing it in communication with the central unit 12.

The public access terminal just described operates in the following manner.

As soon as a payment card is introduced into the reader 22, and is detected by means of an appropriate sensor built into the reader, the telephony circuits 26 effect, after line seizure, the dialling of the telephone number of a specific server centre linked to the STN telephone network so as to establish a telephone link with the latter. This link is maintained for a predetermined maximum duration, which may be as much as an hour, depending on the type of server used. It is, however, maintained as long as the payment card is introduced into the reader and is so as a function of an available call credit.

As soon as the first metering pulse is received from the server centre, the microcontroller 34 causes the relay 38 to switch in such a way as to establish a communication between the central unit 12 and the digital line of the ISDN telephone network.

Thereafter, it is possible to navigate around this network by way of this ISDN line by using the navigation algorithm stored in memory in the central unit 12, and by using the peripherals 14, 16 and 18.

As soon as the telephone link with the server centre is severed, at the end of communication or as soon as the payment card is removed from the reader 22, the relay 38 is again switched in such a way that it reverts to its initial state, this having the effect of disconnecting the central unit 12 from the line of the ISDN network.

It will be noted moreover that the navigation algorithm stored in the central unit 12 is adapted to allow the user to access either data internal to the terminal 10, that is to say stored in the central unit 12, and to do so gratis, or to access data by way of the computer network, as soon as the switching of the relay 38 has been performed, that is to say as soon as the central unit 12 is in communication with the digital line and to do so at a cost.

As mentioned earlier, the telephone link established between the terminal 10 and the server centre is maintained for a predetermined period of time.

To do this, the terminal 10 and the server exchange signals having specific frequences in such a way as to simulate a telephone communication and thus avoid the severing of the telephone link.

As a variant, the signals exchanged between the telephone terminal 12 and the server centre are used to transfer data to the central unit 12 in such a way as to allow them to be consulted by the user as mentioned earlier. For example, these data consist of advertising information or information pertaining to the geographical area in which the terminal 10 is located.

Figure 3:
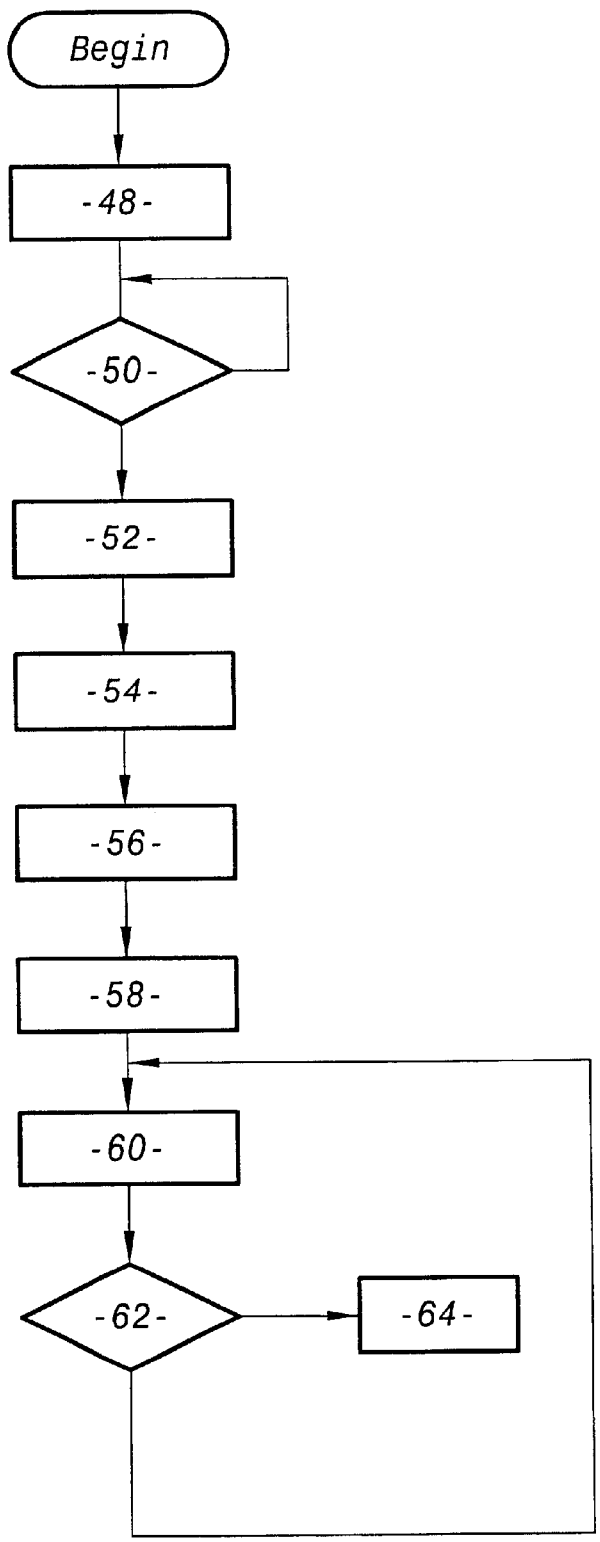

The precise description of the operation of the terminal 10 which has just been described will now be given with reference to FIG. 3.

In the course of a first step 48 the terminal 10 precedes to the activation of the modem 32, then waits for the 1300 Hertz and 2100 Hertz carriers conveyed on the STN analogue telephone network (step 50).

As soon as the carriers are received, the stability of the carriers is checked (step 52), and, in the case where the carriers are stable, a corresponding message is issued to the central unit 12 (step 54).

During the following step 56, the telephony circuits 26 perform a line seizure and effect the dialling of the telephone number of the server centre in such a way as to establish a telephone link between it and the terminal 10.

During the following step 58, as soon as a metering pulse is received from the server centre, the microcontroller 34 causes the relay 38 to switch in such a way as to establish a communication between the central unit 12 and the digital line of the ISDN network.

The procedure continues with a line maintenance phase in the course of which signals are exchanged between the server and the terminal so as to simulate a communication. This phase begins with a step 60 in the course of which a character string is sent to the server. During the following step 62, the terminal 10 waits for a response from the server, and does so for a predetermined period of time, for example ten seconds and proceeds to a check of the carrier.

In the case where no response is received or if the carrier is lost, during the following step 64, a corresponding message is issued to the central unit 12. The relay 38 is then deactivated in such a way as to disconnect the central unit 12 from the digital line, and the telephone communication established on the analogue line is severed.

Conversely, if the carrier is stable and if a response is received from the server, the process returns to the previous step 60.

In the course of this line maintenance phase the metering pulses received from the server cause a corresponding withdrawal of telephone units or a withdrawal from the user's bank account, as a function of the card type used.

Likewise, in the course of this phase a secondary processing is performed by the central unit 12 for navigation around the computer network and the processing of the instructions received from the peripherals.

It will be noted that the invention which has just been described, and which makes it possible to access a computer network by using a digital link of a digital telephone network, allows loading of files and navigation around this network at increased speed, whilst allowing metering of the service thus provided, by using an analogue line.

The invention is not however limited to the embodiment described. In particular, it will be noted that the server centre used for the metering can consist of a voice server, but, preferably, use is made of a server of telematic type, or "kiosk" for example national or regional, which allows a communication to be maintained for an increased duration and at a reduced cost.

What is claimed is:

1. A public terminal for access to a computer network, comprising:

means (24) for linking the terminal to an analog telephone network (STN);

a central unit (12) furnished with peripherals (14, 16, 18) providing a human/machine interface;

an algorithm for navigating around the computer network, stored in memory;

a telecommunications payment cards reader (22);

automatic means (26) for establishing a telephone link with a server center by the way of the analog telephone network as soon as a payment card is introduced into the reader (22) as a function of an available call credit, said automatic means (26) maintaining the telephone link as long as the payment card is introduced into the reader (22); and means for linking the terminal to a digital network (ISDN), said means for linking comprising a relay (38) controlled by the central unit (12) in such a way as to maintain a communication between said central unit (12) and the digital network as long as the telephone link with the server center is maintained.

2. The terminal according to claim 1, wherein the central unit (12) is linked to a card (30) adapted so as to place the central unit (12) in communication with the digital network (ISDN) and controlling the relay (38) in such a way as to establish the communication with the digital network upon reception of a metering pulse received from a telephony network to which the server center is linked.

3. The terminal according to claim 1, wherein the server center and the terminal (10), exchange signals in such a way as to simulate a communication so as to maintain the telephone link.

4. The terminal according to claim 3, further comprising, stored in memory, data which can be accessed free of charge by a user.

5. The terminal according to claim 4, wherein signals exchanged between the server and the terminal (10) constitute means of transferring data to the terminal for their storage in memory.

6. The terminal according to claim 4, further comprising means for directly controlling the relay in the absence of telephone communication established with the server center.

7. the terminal according to claim 1, wherein the server center is a telematic server center.

8. The terminal according to claim 1, further comprising, stored in memory, data which can be accessed free of charge by a user.

9. The terminal according to claim 5, further comprising means for directly controlling the relay in the absence of telephone communication established with the server center.

10. The terminal according to claim 1, wherein said relay (38) is controlled by said central unit (12) in such a way as to establish a communication between the central unit and the digital network as soon as the telephone link is established by said automatic means (26), and as to disconnect said central unit (12) from the digital network as soon as the telephone link with the server center is no longer maintained by the automatic means (26).

11. The terminal according to claim 1, further comprising a memory storing a telephone number of the server center, and wherein said automatic means automatically retrieves and dials the telephone number as soon as the payment card is introduced into the reader, as a function of available call credit.

12. A public terminal for accessing a digital network, the terminal comprising:

a payment card reader;

a memory storing a telephone number of a server for the digital network;

a telephony circuit for automatically retrieving from said memory and dialing the telephone number of the server as soon as said payment card reader senses a payment card having credit thereon, said telephony circuit maintaining an analog telephone link with the server so long as said payment card reader senses the payment card having credit thereon and stopping the analog telephone link with the server when said payment card reader no longer senses a payment card having credit thereon;

a modem that receives signals from the server through the analog telephone link indicating that the analog telephone link between the terminal and the server is being maintained;

a central unit that is connected to said modem and that has a human/machine interface for accessing the digital network; and a relay that is connected to and controlled by said central unit and that is connected to the digital network, said relay connecting said central unit to the digital network as soon as said modem receives the signals from the server, maintaining the connection between said central unit and the digital network so long as said modem receives the signals from the server, and disconnecting said central unit from the digital network when said modem no longer receives the signals from the server.

\* \* \* \* \*